United States Patent
Blake, III et al.

(10) Patent No.: US 6,374,696 B1
(45) Date of Patent: Apr. 23, 2002

(54) DETENT ASSEMBLY

(75) Inventors: Thomas E. Blake, III, South Lyon, MI (US); Ignacio Gutierrez, Madrid (ES); Vu Le, Ypsilanti, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/466,458

(22) Filed: Dec. 17, 1999

(51) Int. Cl.$^7$ ................................................. G05G 5/06
(52) U.S. Cl. ........................ 74/527; 74/10.41; 200/565
(58) Field of Search ............................ 74/10.41, 502.2, 74/489, 527, 531; 200/564, 565

(56) References Cited

U.S. PATENT DOCUMENTS

| | | | | |
|---|---|---|---|---|
| 3,226,999 A | * | 1/1966 | Allison | 74/10.41 |
| 3,234,801 A | * | 2/1966 | Valdettaro et al. | 74/10.41 |
| 4,455,886 A | * | 6/1984 | Schmitt | 74/10.41 |
| 4,766,641 A | * | 8/1988 | Daglow | 15/390 |
| 5,589,671 A | * | 12/1996 | Hackbarth et al. | 74/527 |
| 5,590,564 A | * | 1/1997 | Kishimoto | 74/527 |
| 5,799,542 A | * | 9/1998 | Yamane | 74/502.2 |
| 6,067,875 A | * | 5/2000 | Ritchey et al. | 74/527 |
| 6,085,612 A | * | 7/2000 | Thorn et al. | 74/531 |
| 6,216,553 B1 | * | 4/2001 | Wessel et al. | 74/489 |

* cited by examiner

Primary Examiner—David A. Bucci
Assistant Examiner—Chong H. Kim
(74) Attorney, Agent, or Firm—Tarolli, Sundheim, Covell, Tummino & Szabo L.L.P.

(57) ABSTRACT

A detent assembly (30) includes a rotatable index member (34) having a series (44) of minor index positions (46) disposed in a circular array and a series (52) of major index positions (54) disposed in a circular array which is axially offset from the circular array of minor index positions. A plurality of first spring sections (124) are integrally formed as one piece with a housing (32) which encloses the index member (34). The first spring sections (124) are disposed in a circular array which extends around the index member (34). Each of the first spring sections (124) is disposed in engagement with the series (44) of minor index positions (46). A second spring section (66) is integrally formed as one piece with the housing and is disposed in engagement with the series (52) of major index positions (54). A stem (40) extends axially from one end of the index member (34) and is engageable by a handle. A pair of connector arms (82 and 84) extend from the opposite end of the index member (34) and are engageable with a pulley (22) to enable force to be transmitted from the handle through the index member to the pulley.

21 Claims, 8 Drawing Sheets

DETENT ASSEMBLY

BACKGROUND OF THE INVENTION

The present invention relates to a new and improved detent assembly and more specifically to a detent assembly which may be utilized to control the setting of a temperature, fan speed, and/or air flow control device in a vehicle.

A known detent mechanism which may be used to control the setting of the temperature, fan speed, and/or air flow control device in a vehicle is disclosed in U.S. Pat. No. 5,606,893. This detent mechanism includes a pair of cup-shaped wheels having cylindrical side walls with teeth which are disposed in coaxial circular arrays. A plurality of gears are connected with a carrier which is rotatable relative to the wheels. Upon rotation of the carrier, movement occurs between the wheels. A plurality of springs are provided to maintain the teeth on the cup-shaped wheels in engagement with the teeth on the gears connected with the carrier.

SUMMARY OF THE INVENTION

The present invention provides a new and improved detent assembly having a rotatable index member disposed within a housing. A series of minor index positions are disposed in an arcuate array on the index member. Each index position in the series of minor index positions may have a configuration corresponding to the configuration of a portion of a sine wave. In addition, a series of major index positions are disposed in an arcuate array on the index member.

A first index element is engageable with the index positions in the series of minor index positions. A second index element may be engageable with index positions in the series of major index positions. The first and second index elements may be integrally formed as one piece with the housing.

The first index element may include a plurality of first spring sections which are integrally formed as one piece with the housing and are disposed in a circular array which extends around the index member. Each of the first spring sections includes first and second spring arms which are connected with the housing and a connector portion which extends between the spring arms and is disposed in engagement with the series of minor index positions. The second index element may include a second spring section which is integrally formed as one piece with the housing and includes a first spring arm having a first end portion which is connected with the housing and a second spring arm having an end portion connected with the housing. A connector portion extends between the spring arms and is disposed in engagement with the series of major index positions.

The index member may have a stem portion which extends in one direction from the index member and is connectable with a handle. One or more connector arms may extend from the index member in a direction opposite from the stem portion and be connectable with a pulley in a force transmitting assembly which is actuated by force transmitted from the handle through the index member to the pulley.

BRIEF DESCRIPTION OF THE DRAWINGS

The foregoing and other features of the present invention will become apparent to one skilled in the art to which the present invention relates upon consideration of the following description of the invention with reference to the accompanying drawings wherein.

DESCRIPTION OF ONE SPECIFIC PREFERRED EMBODIMENT OF THE INVENTION

General Description

A drive assembly 10 (FIG. 1) may be utilized to transmit force between an instrument panel of a vehicle and heating, ventilating and/or air conditioning control members in the vehicle. The heating, ventilating and/or air conditioning control members (not shown) are moved by the drive assembly to obtain the desired conditions within the passenger compartment of the vehicle. However, it is contemplated that the drive assembly 10 could be utilized in association with devices other than heating, ventilating and/or air conditioning controls for a vehicle.

The drive assembly 10 (FIG. 1) includes an input assembly 12 and an output assembly 14. Tubular housings 16 and 18 enclose a flexible drive element, such as a rope or cable, which extends between the input assembly 12 and the output assembly 14. Input forces are transmitted through the rope or cable from the input assembly 12 to the output assembly 14 to move the heating, ventilating and/or air conditioning control elements in a known manner.

Figures 1, 2:
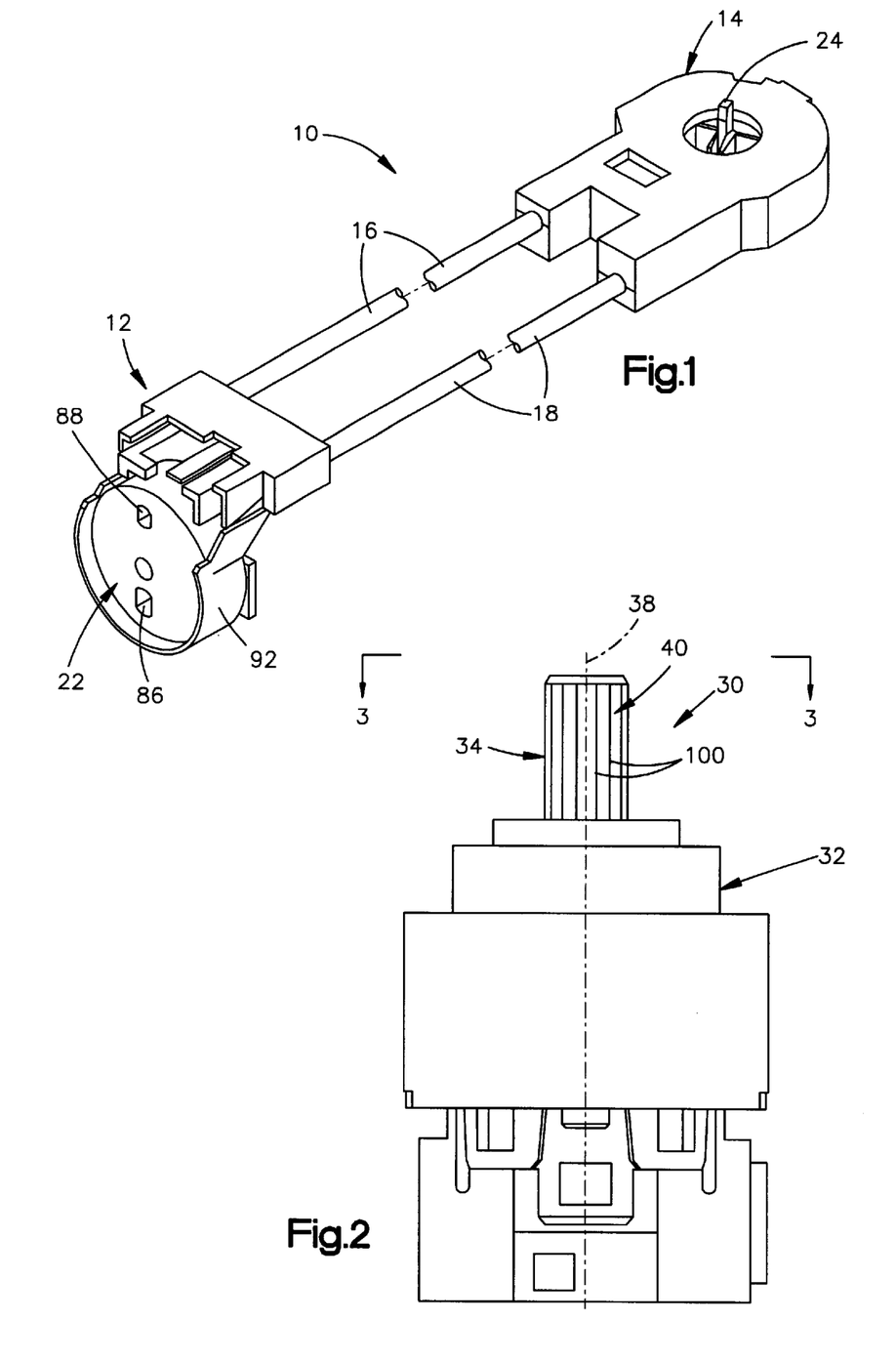
FIG. 1 is a fragmentary schematic pictorial illustration of a drive assembly.
FIG. 2 is a side elevational view of a detent assembly which may be connected with and transmit force to effect operation of the drive assembly of FIG. 1.

The input assembly 12 includes a circular pulley 22 around which the cable enclosed by the tubular housings 16 and 18 extends. Similarly, the output assembly 14 includes a pulley around which the cable enclosed by the tubular housings 16 and 18 extends. An output member 24 is integrally formed with the pulley in the output assembly 14 and is connected with one or more components of the heating, ventilating and/or air conditioning system for the vehicle. The general construction and mode of operation of the drive assembly 10 is well known and will not be further described herein in order to avoid prolixity of description.

In accordance with a feature of the present invention, an improved detent assembly 30 (FIGS. 2, 3 and 4) is connected with the pulley 22 (FIGS. 1 and 4) in the drive assembly 12. The detent assembly 30 includes a circular housing 32 (FIGS. 2, 3 and 4) which encloses a rotatable index member 34 (FIGS. 4, 5, 6, 7 and 8) which is integrally molded as one piece. The index member 34 is rotatable about a central axis 38 (FIG. 4) of the index member and housing 32. Force to rotate the index member is applied to a handle or knob (not shown) which is connected with a stem portion 40 (FIGS. 4 and 5) of the index member.

In accordance with one of the features of the index member 34, a series 44 (FIGS. 5 and 6) of minor index positions 46 are disposed in a circular array about a cylindrical body portion 48 of the index member. A series 52 (FIGS. 5 and 7) of major index positions 54 are disposed in a circular array about a circular flange portion 56 of the index member 34. The circular series 44 of minor index positions and the circular series 52 of major index positions are disposed in a coaxial relationship on the index member 34.

Each of the minor index positions 46 (FIG. 6) is formed by a groove which extends axially along the body portion 48. Central axes of the grooves forming the minor index positions 46 extend parallel to the central axis 38 of the index member 34. Each of the major index positions 54 (FIG. 7) is formed by a projection or nose which extends axially along the flange portion 56. Central axes of the projections forming the major index positions 54 extend parallel to the central axis 38 of the index member 34.

Figure 5:
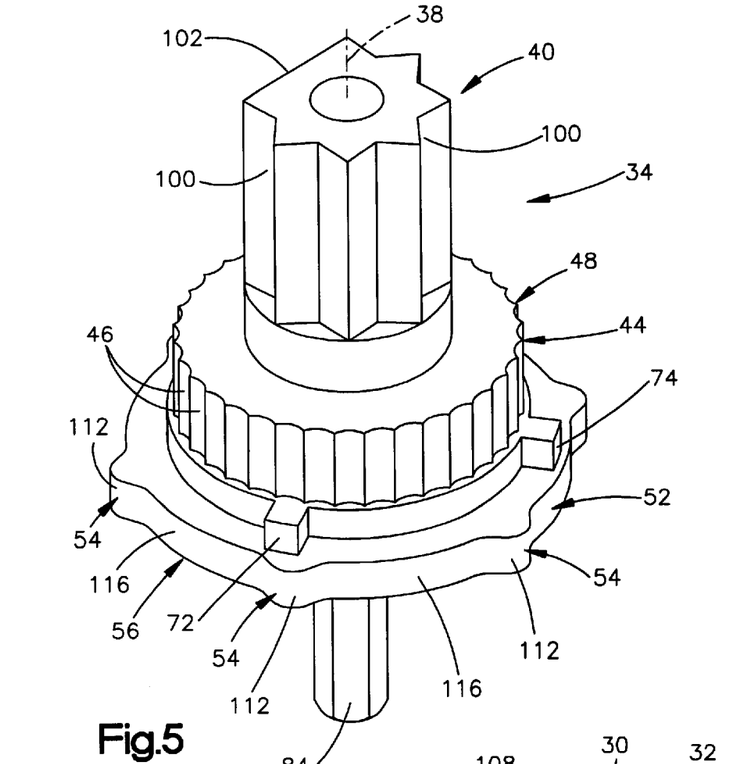
FIG. 5 is a pictorial illustration of the index member of FIG. 4.

A first or minor index element 62 (FIG. 6) is connected with the housing 32 and is engageable with a minor index positions 46 in the series 44 of minor index positions. A second or major index element 66 (FIG. 7) is connected with the housing 32 and is engageable with the major index positions 54 in the series 52 of major index positions. The major index positions 54 are spaced apart by a greater arcuate distance than the minor index positions 46. Thus, the arcuate extent between a pair of adjacent major index positions 54 (FIGS. 5 and 7) is greater than the arcuate extent of a plurality of minor index positions 46 (FIGS. 5 and 6).

Figure 6:
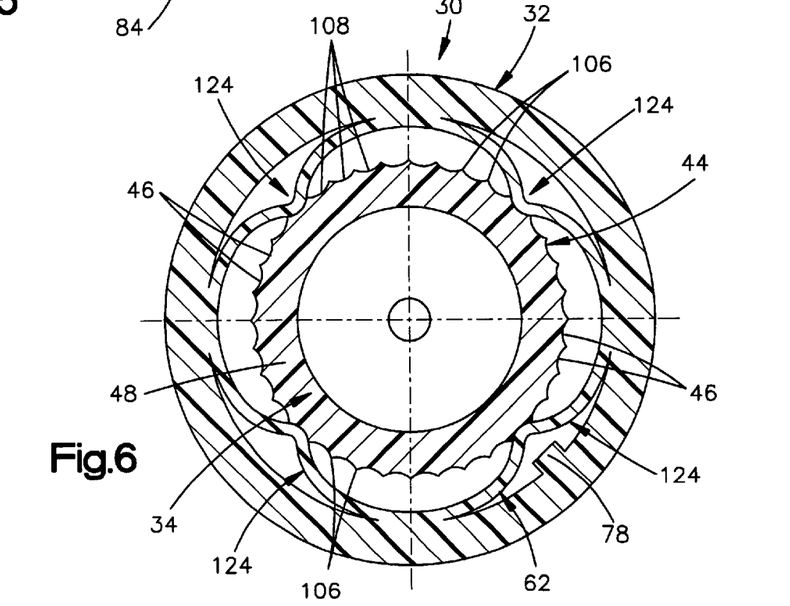
FIG. 6 is a sectional view, taken generally along the line 6—6 of FIG. 4, illustrating the relationship of a series of minor index positions disposed on the index member of FIG. 5 to a resilient index element.

In accordance with one of the features of the invention, the first or minor index element 62 is integrally formed as one piece with the housing 32 (FIG. 6). In accordance with another feature of the present invention, the second or major index element 66 (FIG. 7) is integrally formed as one piece with the housing 32. By forming the first or minor index element 62 and the second or major index element 66 (FIGS. 6 and 7) as one piece with the housing 32, the number of components of the detent assembly 30 is minimized. Of course, this facilitates fabrication of the detent assembly 30 and minimizes the cost of the detent assembly.

A pair of rectangular stop sections 72 and 74 (FIGS. 5 and 8) are provided on the index member 34 to limit the range of rotational movement of the index member. The stop sections 72 and 74 project radially outward from the body portion 48 (FIG. 5) of the index member 34. The stop sections 72 and 74 are axially offset from and are disposed between the series 44 of minor index positions and the series 52 of major index positions. The stop sections 72 and 74 on the index member 34 are engageable with a rectangular stop section 78 (FIG. 8) on the housing 32.

The index member 34 is rotatable between a position in which the stop section 74 on the index member engages the stop section 78 on the housing 32 (FIG. 8) and a position in which the stop section 72 on the index member 34 engages the stop section 78 on the housing 32. Thus, the index member 34 is rotatable in a clockwise direction from the position shown in FIG. 8 to a position in which the stop section 72 on the index member engages the stop section 78 on the housing 32.

The index member 34 (FIG. 5) is connected with the pulley 22 (FIG. 1) in the input assembly 12 of the drive assembly 10. To interconnect the index member 34 and the pulley 22, a pair of parallel connector arms 82 and 84 (FIG. 4) extend axially from an end portion of the index member 34 opposite from the stem portion 40. The connector arms 82 and 84 extend into openings 86 and 88 in the pulley 22.

Figure 4:
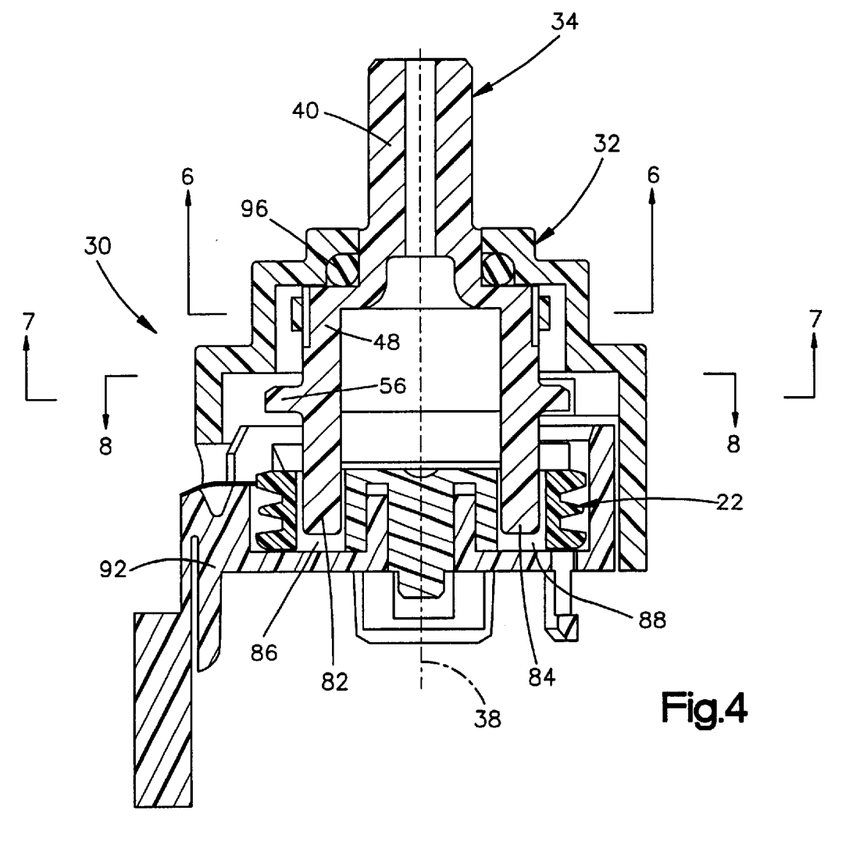
FIG. 4 is a sectional view, taken generally along the line 4—4 of FIG. 3, illustrating the relationship of a rotatable index member to a housing which encloses the index member and to a pulley in the drive assembly of FIG. 1.

The connector arms 82 and 84 extend parallel to the central axis 38 of the detent assembly 30. The pulley 22 is supported for rotation about the axis 38 by a stationary base 92 (FIGS. 1 and 4). The housing 32 (FIG. 4) is fixedly connected with the stationary base 92. Although the connector arms 82 and 84 have the same radial cross sectional configuration, the connector arm 82 and the opening 86 have a greater circumferential extent about the central axis 38 of the index member 34 than the connector arm 84 and opening 88. This enables the index member 34 to be connected with the pulley 22 only when the index member is in a predetermined orientation relative to the pulley.

When the detent assembly 30 is connected with the drive assembly 10 (FIG. 1) and used to control heating, ventilating and/or air conditioning elements of a vehicle, it is contemplated that the series 44 (FIG. 5) of minor index positions 46 will be utilized in association with temperature control elements. Therefore, the minor index positions 44 may be referred to as temperature detents.

When the detent assembly 30 is used with heating, ventilating and/or air conditioning controls for a vehicle, the series 52 of major index positions 54 will be associated with major modes of operation of the heating, ventilation and/or air conditioning controls. Thus, the major index positions 54 may be associated with a particular operating mode, such as defrost, fresh air, or air directed toward the instrument panel and/or floor of the vehicle.

In some control systems, a plurality of drive assemblies 10 (FIG. 1) and detent assemblies 30 (FIG. 4) will be used to control a plurality of separate functions. When this is done, only the series 44 of minor index positions will be utilized in at least one detent assembly 30 to control a particular function, such as temperature. Another detent assembly 30 will utilize only the series 52 of major index positions to control a particular function, such as air flow in the vehicle. Still another detent assembly 30 may utilize both the series 44 of minor index positions and the series 52 of major index positions.

If desired, an O-ring 96 (FIG. 4) may be provided between the body portion 48 on the index member 34 and the housing 32. The O-ring 96 will function to absorb sound and vibration caused by engagement of the index elements 62 and 66 with the series 44 and 52 of index positions on the index member 34. The O-ring 96 also provides resistance to rotation so that a minimum torque is required to rotate the index member 34. However, it is contemplated that the O-ring 96 could be eliminated if desired in order to simplify the fabrication of the detent assembly 30.

Index Member

The index member 34 is integrally molded as one piece of wear resistant material. The index member may be formed of nylon 6—6 which has been mechanically reinforced with 33% glass fiber. Alternatively, the index member 34 could be injection molded of polyphenylene sulfide with carbon fiber and polytetrafluoroethylene. Of course, the index member 34 could be formed of different materials if desired.

Figure 3:
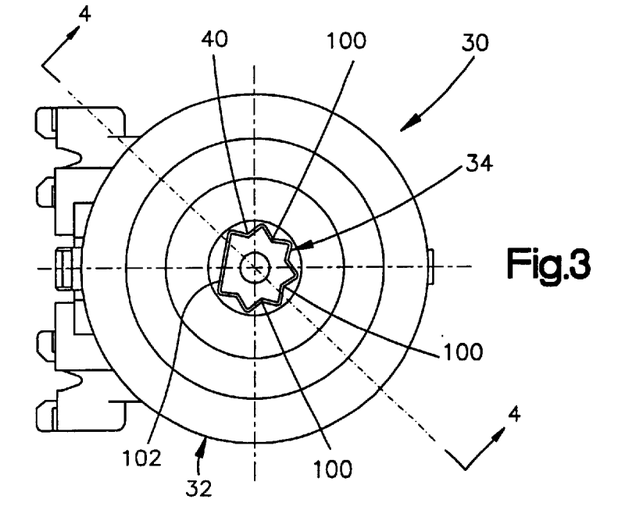
FIG. 3 is a top plan view, taken generally along the line 3—3 of FIG. 2, further illustrating the construction of the detent assembly.

The stem portion 40 extends axially upward (as viewed in FIG. 5) from the body portion 48 of the index member 34. Suitable axially extending grooves 100 are formed in the periphery of the stem portion 40 (FIGS. 3 and 5). The grooves 100 have longitudinal central axes which extend parallel to the central axis 38 (FIG. 4) of the index member 34. A flat side surface 102 (FIGS. 3 and 5) is formed on the stem portion 40 and extends parallel to the grooves 100 and the central axis 38 of the index member 34.

The stem portion 40 of the index member 34 (FIG. 5) is received in correspondingly shaped opening formed in a handle or knob (not shown). The flat side surface 102 enables the stem portion 40 to be inserted into the opening in the handle only when the handle is in a desired orientation relative to the index member 34. The grooves 100 and flat side surface 102 enable force to be transmitted from the handle to the index member 34.

This force is transmitted through the connector arms 82 and 84 (FIG. 4) to the pulley 22 in the drive assembly 10 (FIG. 1). Rotation of the pulley 22 enables a flexible force transmitting element, such as a cable or rope, to transmit force to a pulley on the output assembly 14. Rotation of the pulley in the output assembly 14 is effective to move a control member in a heating, ventilation and/or air conditioning system for the vehicle. It should be understood that although the detent assembly 30 may advantageously be utilized in association with heating, ventilation and/or air conditioning controls for a vehicle, the detent assembly could be utilized with other apparatus if desired.

The series 44 (FIG. 5) of minor index positions 46 on the body portion 48 of the index member 34 enable an operator to effect relatively small increments of rotational movement of the index member 34. The minor index positions 46 are formed by ridges 106 (FIGS. 6 and 9) which are separated by arcuate grooves 108. The arcuate grooves 108 are formed as portions of cylinders having longitudinal central axes extending parallel to the longitudinal central axis 38 of the index member 34. Although it is preferred to form the grooves 108 with arcuate bottom surfaces in order to avoid stress concentrations, the grooves could have more sharply defined bottom surfaces if desired.

The series 52 (FIGS. 5, 7 and 10) of major index positions 54 is located radially outward of the series 44 of minor index positions. The major index positions 54 are disposed on the generally circular flange 56 which extends outward from the body portion 48 (FIG. 5) of the index member 34. The flange 56 has a central axis which is coincident with the central axis of body portion 48 and the central axis 38 of the index member 34.

The series 52 of major index positions 54 are disposed in a circular array about the central axis 38 of the index member 34. The major index positions are formed by outwardly projecting ridges 112 (FIG. 7) formed on the circular flange portion 56. The ridges 112 form radially outwardly projecting noses on the circular flange portion 56. The ridges 112 are separated by smooth arcuate side surfaces 116 disposed in a circular array. The side surfaces 116 are formed as portions of a cylinder and are spaced apart by the radially outwardly projecting ridges 112.

The ridges 112 which form the index positions 54 on the flange portion 56, are spaced apart by a substantially greater arcuate distance than are the ridges 106 (FIG. 6) which form the minor index positions 46 on the body portion 48 of the index member 34. For example, there may be thirty-six ridges 106 in the series 44 of minor index positions. There are only six ridges 112 (FIG. 7) in the series 52 of major index positions. Of course, the number of ridges 106 (FIG. 6) in the series 44 of minor index positions or the number of ridges 112 (FIG. 7) in the series 52 of major index positions may be different than the foregoing specific example.

Figure 7:
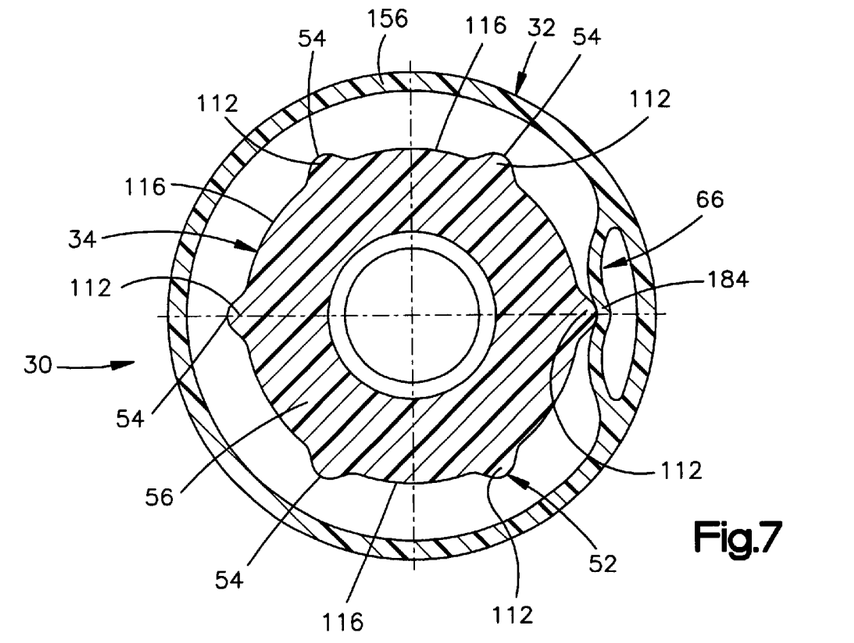
FIG. 7 is a sectional view, taken generally along the line 7—7 of FIG. 4, illustrating the relationship of a series of major index positions disposed on the index member of FIG. 5 to a resilient index element.
Figure 8:
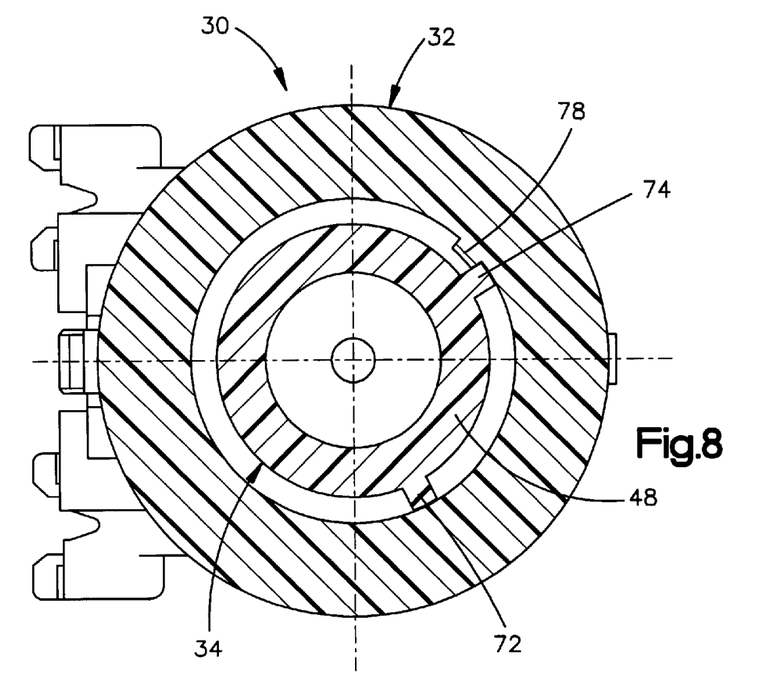
FIG. 8 is a sectional view, taken generally along the line 8—8 of FIG. 4, illustrating the relationship of a pair of stop sections on the index member to a stop section on the housing.

The stop sections 72 and 74 (FIG. 5) are disposed on the index member 34 at a location between the series 44 of minor index positions and the series 52 of major index positions. The stop sections 72 and 74 have a generally rectangular cross sectional configuration (FIG. 8) and have central axes which extend parallel to the central axis 38 (FIG. 5) of the index member 34. The stop sections 72 and 74 are axially offset from the series 44 of minor index positions and the series 52 of major index positions to prevent interference between the stop sections and the index elements 62 and 66 (FIGS. 6 and 7).

Housing

In accordance with one of the features of the present invention, the first or minor index element 62 (FIG. 6) is integrally formed as one piece with the housing 32. In addition, the second or major index element 66 (FIG. 7) is integrally formed as one piece with the housing 32. By forming the index elements 62 and 66 as one piece with the housing 32, the number of components of the detent assembly 30 is minimized.

In the specific embodiment of the invention disclosed herein, the housing 32 is injection molded as one piece resilient, wear resistant material. The housing 32 is formed of an acetyl copolymer, specifically POM-C. Of course, the housing 32 could be integrally formed as one piece by methods other than injection molding and could be formed of materials other than an acetyl copolymer.

Although it is preferred to form the housing 32 and the first or minor index element 62 (FIG. 6) and second or major index element 66 (FIG. 7) as one piece, they could be formed separately if desired. For example, the first or minor index element 62 (FIG. 6) could be a circular ring member formed of a polymeric or metal material. Alternatively, the first or minor index element 62 could be formed by a plurality of separate spring members.

The second or major index element 66 (FIG. 7) could be formed by a separate spring member formed of metal or polymeric material. Although only a single second or major index element 66 is illustrated in FIG. 7, it is contemplated that a plurality of major index elements 66 could be provided if desired. However, it is believed that it will be preferred to form the first or minor index element 62 and the second or major index element 66 as one piece with the housing 32 in order to minimize the number of components of the detent assembly 30 and thereby simplify fabrication of the detent assembly.

The first or minor index element 62 includes a plurality of spring sections 124 (FIG. 6) disposed in a circular array which extends around the body portion 48 of the index member 34. Each of the spring sections 124 has the same construction and is integrally molded as one piece with the housing 32.

One of the spring sections 124 (FIG. 9) includes a pair of spring arms 128 and 130 having mounting end portions 132 and 134 which are fixedly connected with the housing 32. Free end portions 136 and 138 of the spring arms 128 and 130 are interconnected by a connector portion 140. The connector portion 140 of the spring section 124 is disposed in engagement with a groove 108 disposed between a pair of ridges 106 in the series 44 of minor index positions. The arcuate connector portion 140 engages the groove 108 to hold the index member 34 against rotational movement relative to the housing 32.

Figure 9:
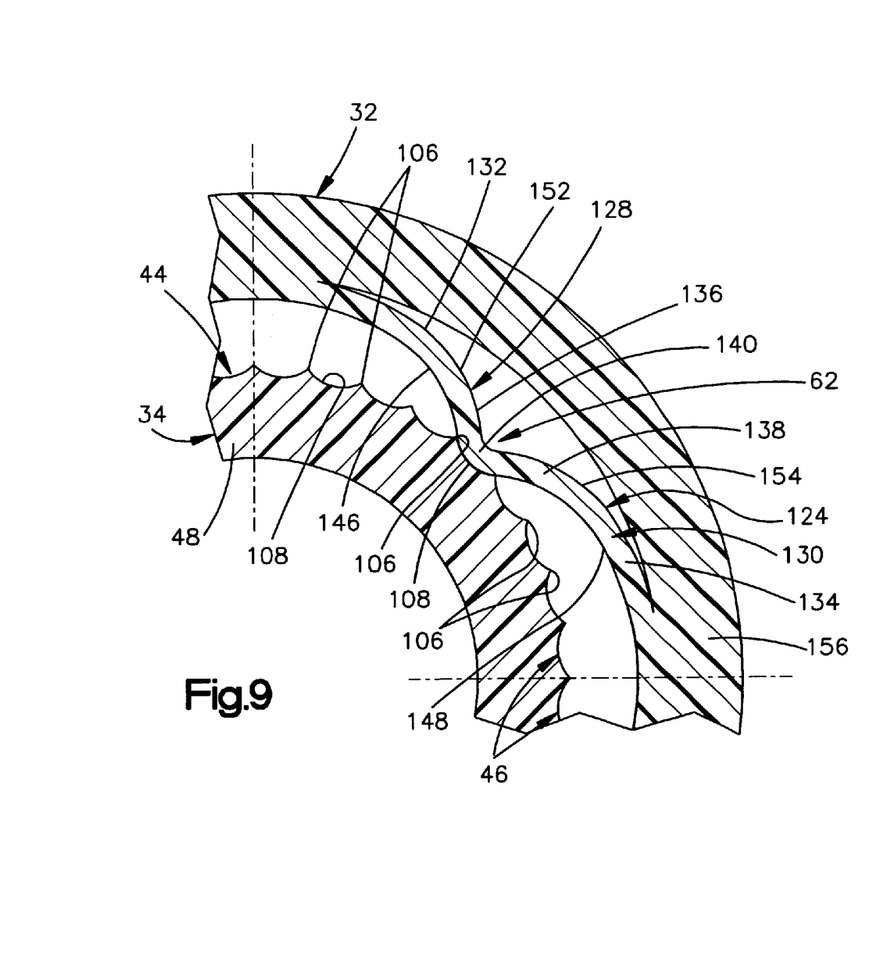
FIG. 9 is an enlarged fragmentary illustration of a portion of FIG. 6 and depicting the relationship between a spring section and minor index positions on the index member.

The spring arms 128 and 130 have an arcuate configuration with concave inner side surfaces 146 and 148 which face inwardly toward the index member 34. The spring arms 128 and 130 have convex outer side surfaces 152 and 154 which face outward toward a cylindrical side wall 156 of the housing 32. The concave inner side surfaces 146 and 148 on the spring arms 128 and 130 have centers of curvature which are disposed radially inward of the series 44 of minor index positions disposed on the body portion 48 of the index member 34. The connector portion 140 has an arcuately curved configuration which enables it to slide with a minimum of interference across the ridges 106 between the grooves 108 in the series 44 of minor index positions.

Although the construction of only one of the spring sections 124 is illustrated in FIG. 9, it should be understood that the first or minor index member 62 includes four identical spring sections 124 (FIG. 6). The four spring sections 124 of the first or minor index element 62 are disposed in a circular array about the body portion 48 of the index member 34. Of course, a greater or lesser number of spring sections 124 could be provided in the first or minor index element 62 if desired. The spring sections 124 could have a configuration which is different than the illustrated configuration.

Figure 10:
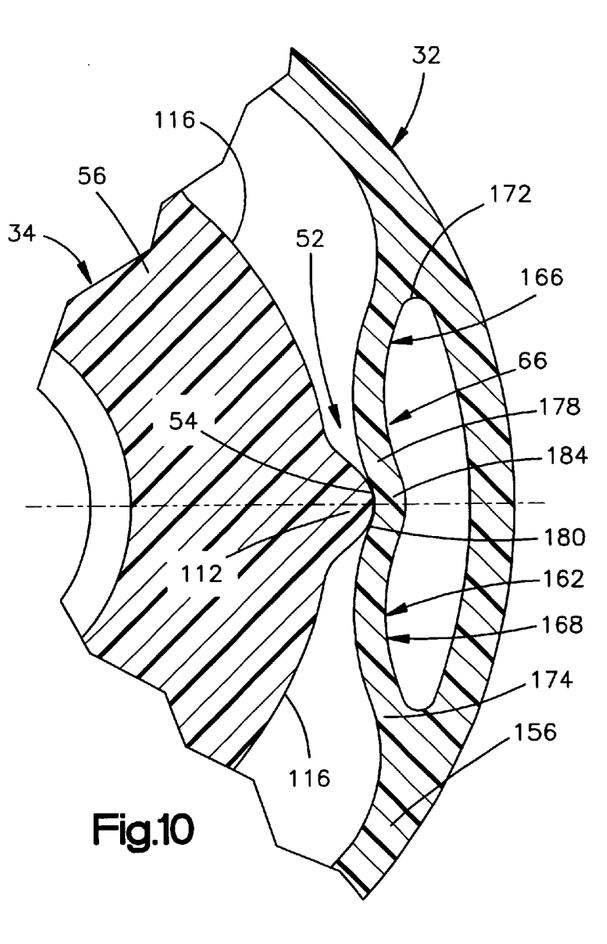
FIG. 10 is an enlarged fragmentary illustration of a portion of FIG. 7 and illustrating the relationship between a spring section and a major index position on the index member.

The second or major index element 66 (FIG. 7) is also integrally molded as one piece with the housing 32. The second or major index element 66 includes a single spring section 162 (FIG. 10). However, if desired, a second or major index element 66 could include a plurality of spring sections which are integrally formed with the housing 32.

The spring section 162 includes spring arms 166 and 168 (FIG. 10). The spring arm 166 has a mounting end portion 172 which is connected with a wall 156 of the housing 32. Similarly, the spring arm 168 has a mounting end portion 174 which is connected with the wall 156 of the housing 32. The spring arm 166 has a free end portion 178. Similarly, the spring arm 168 has a free end portion 180.

The free end portions 178 and 180 of the spring arms 166 and 168 are interconnected by a connector portion 184. The connector portion 184 has an arcuately outwardly curving configuration and engages a ridge 112 at a major index position 54 on the flange portion 56 of the index member 34. The connector portion 184 engages the ridge 112 at the major index position 54 to hold the index member against rotation. The spring section 162 could have a configuration which is different than the illustrated configuration.

Assembly

Assembling the detent assembly 30 is relatively easy. This is because the first or minor index element 62 and the second or major index element 66 are integrally formed as one piece with the housing 32. Although the first or minor index element 62 and the second or major index element 66 could include a plurality of spring elements formed separately from the housing 32, fabrication of the detent assembly 30 is simplified by having the first or minor index element 62 and the second or major index element 66 integrally formed as one piece with the housing 32.

When the detent assembly 30 is to be assembled, the housing 32 is oriented on a fixture with an open end portion of the housing facing upward, that is, in a direction opposite from the orientation shown in FIG. 4. The O-ring 96 is then placed in the housing 32. Alternatively, the O-ring 96 could be mounted on the index member 34 before the index member is inserted into the housing 32. As was previously explained, the O-ring 96 may be eliminated if desired.

The index member 34 is then positioned in the housing 32. As the index member 34 is inserted into the housing, engagement of the series 44 of minor index positions with the first or minor index element 62 centers the index member 34 relative to the housing. Continued axial movement of the index member 34 into the housing results in the first or minor index element 62 engaging the series 44 of minor index positions and in the second or major index element 66 engaging the series 52 of major index positions. Further movement of the index member 34 into the housing 32 results in a leading end of the body portion 48 being pressed against the housing 32. If desired, a suitable retainer could be formed on the index member 34 and the housing 32 to hold the index member against axial movement relative to the housing.

The detent assembly 30 is then connected with the drive assembly 10 (FIG. 1) by moving the housing 32 into a telescopic relationship with the base 92 of the input assembly 12. As this occurs, the connector arms 82 and 84 on the index member 34 move into the openings 86 and 88 formed in the pulley 22 (FIGS. 1 and 3). As this occurs, suitable snap-type fasteners on the housing 32 move into engagement with the base 92 to hold the housing against movement relative to the base.

Second Embodiment

In the embodiment of the invention illustrated in FIG. 9, the minor index positions 46 are formed by ridges 106 which are separated by arcuate grooves 108. In addition, the spring section 124 is formed with a pair of arcuate spring arms 128 and 130 which are interconnected by a connector portion 140. In the embodiment of the invention illustrated in FIG. 11, the minor index positions have configurations corresponding to the configurations of a sine wave which extends around the body portion of the index member. The spring section has a linear configuration with a nose portion which is formed as a portion of a sine wave. Since the embodiment of the invention illustrated in FIGS. 11 through 15 is generally similar to the embodiment of the invention illustrated in FIGS. 1–10, similar numerals will be utilized to identify similar components, the suffix letter "a" being associated with the numerals of FIGS. 11–15 to avoid confusion.

The index member 34a (FIG. 11) includes a series 44a of minor index positions 46a on the body portion 48a of the index member 34a. In accordance with a feature of this embodiment of the invention, the series 44a of minor index positions 46a are formed as a continuous sine wave which extends around the periphery of the cylindrical body portion 48a of the index member 34a. The minor index positions 46a are formed by troughs 108a which are separated by crests 106a.

Figure 11:
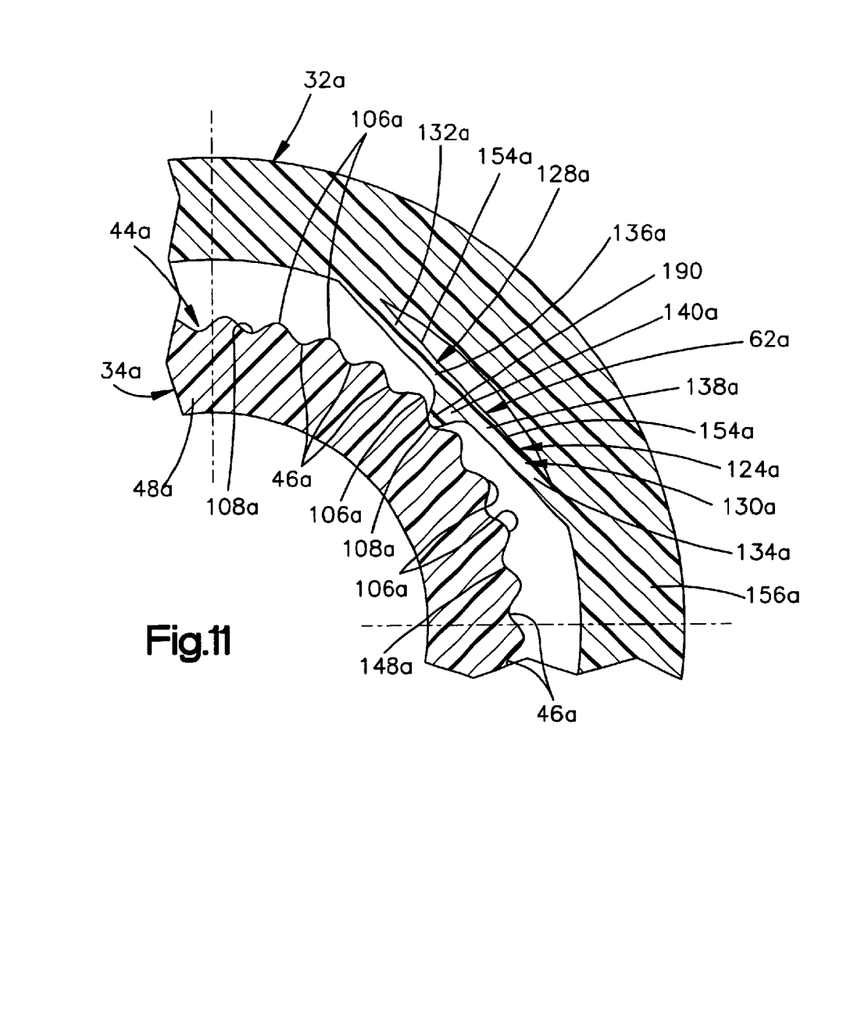
FIG. 11 is an enlarged fragmentary illustration, generally similar to FIG. 9, depicting the relationship between another embodiment of the spring section and an embodiment of the minor index positions in which the index positions form a continuous sine wave about the periphery of the index member.

Each of the crests 106a is formed as a crest of a sine wave. Each of the troughs 108a is formed as a trough of a sine wave. An adjacent crest 106a and an adjacent trough 108a form a continuous period of a sine wave.

The crest 106a and trough 108a forming the minor index positions 46a are interconnected to form an uninterrupted sine wave which extends completely around the body portion 48a of the index member 34a. Each of the crests 106a has the same configuration. Similarly, each of the troughs 108a has the same configuration.

The minor index element 62a (FIG. 11) is integrally formed as one piece with the housing 32a. By forming the index element 62a as one piece with the housing 32a, the number of components of the detent assembly is minimized.

The first or minor index element 62a includes a plurality of spring sections 124a. The spring sections 124a are disposed in a circular array about the body portion 48a of the index member 34a. Although only one spring section 124a has been illustrated in FIG. 11, it should be understood that the other spring sections have the same construction as the spring section 124a.

The spring section 124a includes a pair of spring arms 128a and 130a having mounting end portions 132a, 134a which are fixedly connected with and integrally formed as one piece with the housing 32a. Free end portions 136a and 138a of the spring arms 128a and 130a are interconnected by a connector portion 140a. The connector portion 140a of the spring section 124a is disposed in engagement with a trough 108a disposed between a pair of crests 106a in the series 44a of minor index positions.

The connector portion 140a of the spring section 124a has a nose portion 190 which engages a trough 108a between adjacent crests 106a in the series 44a of minor index positions. In accordance with a feature of this embodiment of the invention, the nose portion 190 has a configuration corresponding to the configuration of a crest of a sine wave. The crest of the sine wave forming the outer surface of the nose portion 190 on the spring section 124a has an amplitude which is greater than the amplitude of the crests and troughs of the sine wave forming the minor index positions 46a on the index member 34a.

By forming the nose portion 190 on the spring section 124a with the configuration of a portion of a sine wave, the nose portion 190 can slide smoothly along the undulations in the sine wave forming the series 44a of minor index positions 46a on the index member 34a. Since both the series 44a of minor index positions 46a and the nose portion 190 have a smooth curving configuration, corresponding to the configurations of sine waves, the nose portion 190 remains in engagement with the series 44a of minor index positions during rotation of the index member 34a relative to the housing 32a. Since the nose portion 190 of the spring section 124a remains in engagement with the series 44a of minor index positions during rotation of the index member 34a, there is minimal noise or clicking as the index member 34a is rotated relative to the housing 32a. In addition, there is smooth tactile feel to the rotation of the index member 34a.

In the embodiment of the invention illustrated in FIG. 11, the spring arms 128a and 130a have a linear configuration. The nose portion 190 on the connector portion 140a between the free end portions 136a and 138a of the spring section 124a projects outward from the linear spring arms 128a and 130a.

The manner in which the nose portion 190 on the spring section 124a cooperates with the minor index positions 46a on the index member 34a is illustrated schematically in FIGS. 12–15. Since the nose portion 190 on the spring section 124a has a configuration corresponding to the configuration of a portion of a sine wave, the nose portion 190 has a smooth sliding engagement with the crests 106a and troughs 108a of the minor index positions 46a. This smooth sliding engagement is promoted by forming the sine wave on the index member 34a with a slightly smaller amplitude than the sine wave on the nose portion 190 of the spring section 124a.

The period of the sine wave on the index member 34a is the same as the period of the sine wave on the nose portion 190 of the spring section 124a. By forming the sine wave on the spring section 124a with a greater amplitude and the same period as the sine wave on the index member 34a, line contact is obtained between the spring section 124a and the index member 34a.

Figure 12:
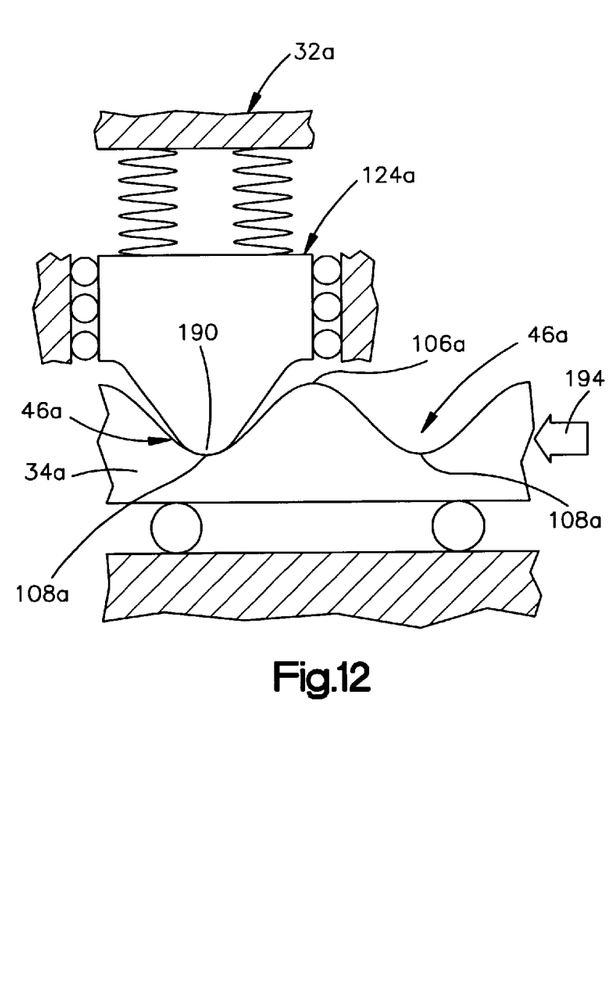
FIG. 12 is a fragmentary schematic illustration of the manner in which a nose portion of the spring section illustrated in FIG. 11 cooperates with one of the index positions.

When the nose portion 190 on the spring section 124a is aligned with a trough 108a of a minor index position 46a, as illustrated schematically in FIG. 12, there is single line contact between the spring section 124a and the index position 46a. This is due to the fact that the sine wave on the nose portion 190 of the spring section 124a has a greater amplitude than the sine wave on the index member 34a.

Figure 13:
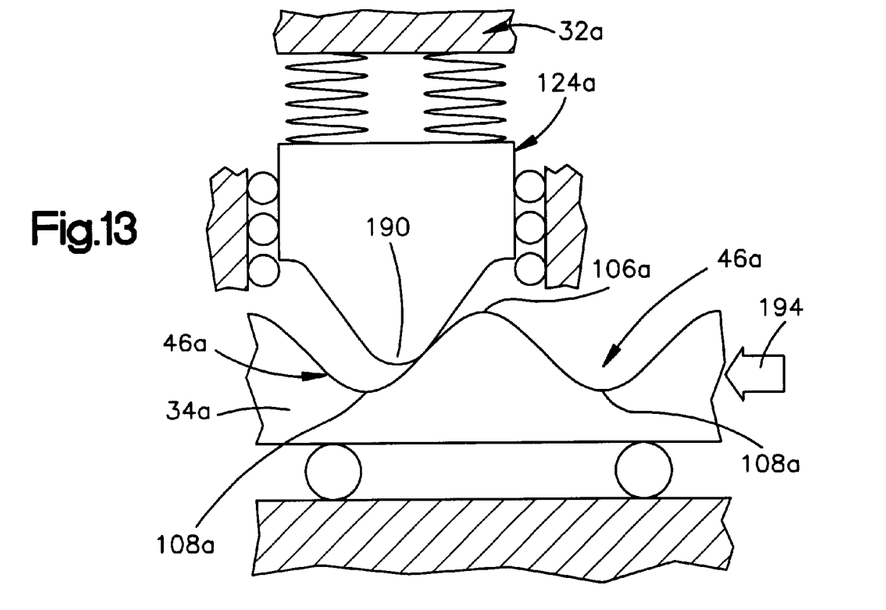
FIG. 13 is a fragmentary schematic illustration depicting the manner in which the nose portion on the spring section is moved along one index position in a direction toward a next adjacent index position.
Figure 14:
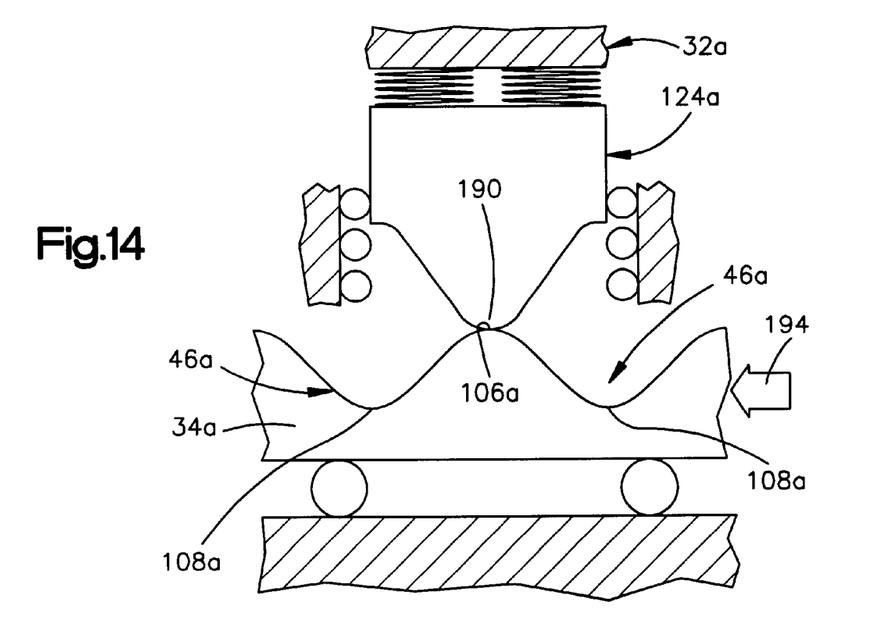
FIG. 14 is a schematic illustration, generally similar to FIGS. 12 and 13, illustrating the manner in which a nose portion of a spring section engages a projection which is disposed between adjacent minor index positions and is formed as a portion of a sine wave.

As the index member 34a is rotated relative to the housing 32a, the index member 34a moves in the direction indicated by an arrow 194 in FIG. 12. As this occurs, the nose portion 190 on the spring section 124a moves up the slope between the trough 108a and a next adjacent crest 106a on the index member 34a (FIG. 13). There is only a single line along which the nose portion 190 on the spring section 124a engages the index member 34a at any time during rotation of the index member 34a.

As the index member 34a continues to be rotated relative to the housing 32a, the crest of the nose portion 190 moves into engagement with the crest 106a on the index member 34a. As this occurs, the smooth arcuate configuration of the sine wave formed on the index member 34a enables the nose portion 190 on the spring section 124a to remain in engagement with the index member 34a even though the index member may be rapidly rotated relative to the housing 32a. Since the nose portion 190 remains in engagement with the index member 34a, there is minimal clicking sound as the index member 34a is moved relative to the housing 32a.

Figure 15:
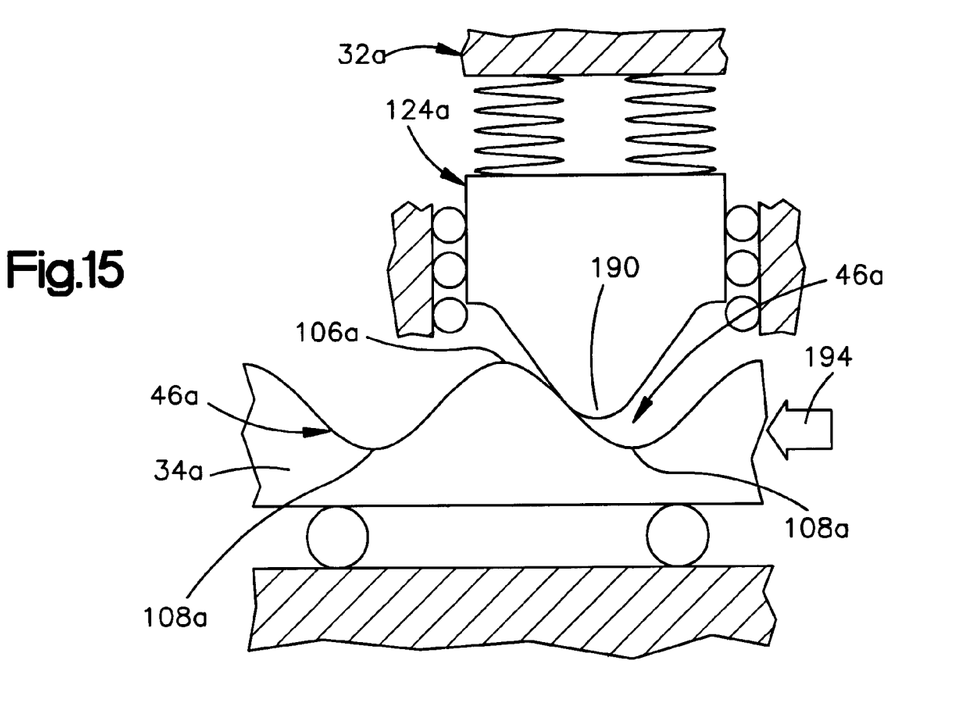
FIG. 15 is a schematic illustration, generally similar to FIGS. 12–14, illustrating the manner in which a nose portion on the spring section moves into a minor index position which is formed as a portion of a sine wave.

Continued rotation of the index member 34a relative to the housing results in the nose portion 190 on the spring section 124a moving along the slope of the a portion of the sine wave on the index member 34a toward the trough 108a of the next minor index position 46a in the manner illustrated schematically in FIG. 15. Continued rotation of the index member 34a relative to the housing 32a moves the nose portion 190 on the spring section 124a into engagement with the trough 108a at a minor index position 46a in the manner illustrated schematically in FIG. 12. Throughout rotation of the index member 34a relative to the housing 32a, there is a single line of contact between the spring section 124a and the index member.

Although only the embodiment of the invention illustrated in FIGS. 11–15 has been shown as having the minor index positions 46a formed by a continuous sine wave which extends completely around the periphery of the index member 34a and the nose portion 190 of the spring section 124a as being formed with a configuration corresponding to the configuration of a sine wave, it should be understood that the embodiment of the invention illustrated in FIGS. 1–10 could also have minor index positions and a cooperating nose portion of a spring section formed as sine waves. Thus, in FIG. 9, the connector portion 140 could be formed with a configuration of a portion of a sine wave and the minor index positions 46 in the series 44 of minor index positions could be formed as a continuous annular sine wave which extends around the body portion 48 of the index member 34.

From the above description of the invention, those skilled in the art will perceive improvements, changes and modifications. Such improvements, changes and modifications within the skill of the art are intended to be covered by the appended claims.

Having described the invention, the following is claimed:

1. A detent assembly comprising:
   a housing;
   a rotatable index member having a series of minor index positions disposed in an arcuate array and a series of major index positions disposed in an arcuate array, said series of minor index positions and said series of major index positions having centers of curvature disposed on an axis about which said index member is rotatable;
   a first index element engageable with said index positions in said series of minor index positions, said first index element being integrally formed as one piece with said housing; and
   a second index element engageable with said index positions in said series of major index positions, said second index element being integrally formed as one piece with said housing.

2. A detent assembly as set forth in claim 1 wherein said index positions in said series of major index positions are spaced apart by an arcuate extent which is at least as great as the arcuate extent of a plurality of said minor index positions.

3. A detent assembly as set forth in claim 1 wherein said index member includes a pair of connector sections which extend from said index member to engage a pulley to transmit rotary movement of said index member to the pulley.

4. A detent assembly as set forth in claim 1 wherein said index member includes a stem which is connectable with a handle to enable rotational force to be transmitted to said index member.

5. A detent assembly as set forth in claim 1 further including a stop element which extends radially outward from said index member and is engageable with a stop surface on said housing to limit rotary movement of said index member relative to said housing.

6. A detent assembly as set forth in claim 1 wherein said first index element includes a spring section having a first end portion connected to said housing, a second end portion connected to said housing at a location offset from said first end portion, and an intermediate portion disposed between said first and second end portions and disposed in engagement with said series of minor index positions on said rotatable index member, said intermediate portion of said spring section spaced from said housing.

7. A detent assembly as set forth in claim 1 wherein said second index element includes a spring section having a first end portion connected to said housing, a second end portion connected to said housing at a location offset from said first end portion, and an intermediate portion disposed between said first and second end portions and disposed in engagement with said series of major index positions on said rotatable index member, said intermediate portion of said spring section being spaced from said housing.

8. A detent assembly as set forth in claim 1 wherein said first index element includes a plurality of spring sections disposed in a circular array which extends around a portion of said rotatable index member and has a center of curvature disposed on the axis about which said index member is rotatable, each of said spring sections of said plurality of spring sections includes a first arcuate spring arm having a first end portion connected with said housing and extending in a first direction along a series of minor index positions, a second arcuate spring arm having a first end portion connected with said housing and extending in a second direction along said series of minor index positions, and a connector portion extending between second end portions of said first and second spring arms and disposed in engagement with said series of minor index positions.

9. A detent assembly as set forth in claim 8 wherein said first and second arcuate spring arms of each of said spring sections have centers of curvature disposed radially inward of the arcuate array of minor index positions.

10. A detent assembly as set forth in claim 1 wherein said series of minor index positions extend completely around said rotatable index member and has a first radius of curvature, said series of major index positions extends completely around said rotatable index member and has a second radius of curvature, said second radius of curvature being larger than said first radius of curvature.

11. A detent assembly as set forth in claim 1 wherein said index member includes a first circular body section on which said series of minor index positions are disposed, a circular flange section on which said series of major index positions are disposed, said flange section extends radially outward of said first circular body section, a second circular body section disposed between said flange section and said first circular body section, a stop section projecting radially outward from said second circular body section, said stop section being engageable with a stop surface on said housing to limit rotation of said index member relative to said housing, said flange section extends radially outward of said stop section.

12. A detent assembly as set forth in claim 11 wherein said first index element includes a plurality of spring sections disposed in a circular array which extends around said first circular body section on said index member, each of said spring sections having a central portion which is engageable with said series of minor index positions, said stop section being aligned with said central portion of one of said spring sections.

13. A detent assembly as set forth in claim 1 wherein each index position in said series of minor index positions has the configuration of a portion of a sine wave having a first amplitude, said first index element has a nose portion with a configuration corresponding to the configuration of a portion of a sine wave having a second amplitude which is greater than said first amplitude, said nose portion of said first index element being sequentially engagable with said minor index positions in said series of minor index positions upon rotation of said index member relative to said housing.

14. A detent assembly as set forth in claim 1 wherein each index position of said series of minor index positions has a configuration corresponding to the configuration of a trough of a sine wave, each index position of said series of minor index positions being separated from an adjacent index position by a projection having a configuration corresponding to the configuration of a crest of a sine wave.

15. A detent assembly comprising:
   a housing;
   a rotatable index member having a series of minor index positions disposed in a circular array and a series of major index positions disposed in circular array, said series of major index positions being offset from said series of minor index positions along an axis of rotation of said index member; and a plurality of first spring sections which are connected with said housing and are disposed in a circular array which extends around said index member, each of said first spring sections includes a first arcuate spring arm having a first end portion connected with said housing and a second end portion spaced from said housing, a second arcuate spring arm having a first end portion connected with said housing and a second end portion spaced from said housing, and a connector portion extending between said second end portions, of said first arcuate spring arm and said second arcuate spring arm said connector portion being disposed in engagement with said series of minor index positions.

16. A detent assembly as set forth in claim 15 further including a second spring section connected with said housing at a location which is offset along the axis of rotation of said index member from said circular array of first spring sections, said second spring section includes a first arcuate spring arm having a first end portion connected with said housing and a second end portion spaced from said housing, a second arcuate spring arm having a first end portion connected with said housing and a second end portion spaced from said housing, and a connector portion extending between said second end portions of said second spring section, said connector portion of said second spring section being disposed in engagement with said series of major index positions.

17. A detent assembly as set forth in claim 15 further including a stem portion extending in a first direction from said series of minor index positions and said series of major index positions, said stem portion being rotatable about the axis of rotation of said index member under the influence of force transmitted from a handle to said stem portion, said index member includes a plurality of connector arms which extend in a second direction which is opposite to said first direction, said connector arms having force transmitting surfaces which are engageable with a pulley to enable force to be transmitted from the handle through said index member to the pulley.

18. A detent assembly as set forth in claim 17 wherein said index positions in said series of major index positions are spaced apart by an arcuate extent which is at least as great as the arcuate extent of a plurality of said minor index positions.

19. A detent assembly as set forth in claim 15 wherein said plurality of first spring sections are integrally formed as one piece with said housing.

20. A detent assembly as set forth in claim 1 wherein each index position in said series of minor index positions has the configuration of a portion of a sine wave having a first amplitude, said connector portion of each of said first spring sections includes a nose portion with a configuration corresponding to the configuration of a portion of a sine wave having a second amplitude which is greater than said first amplitude, said nose portion of said connector portion being sequentially engagable with said minor index positions in said series of minor index positions upon rotation of said index member relative to said housing.

21. A detent assembly as set forth in claim 15 wherein each index position of said series of minor index positions has a configuration corresponding to the configuration of a trough of a sine wave, each index position of said series of minor index positions being separated from an adjacent index position by a projection having a configuration corresponding to the configuration of a crest of a sine wave.

* * * * *